(12) United States Patent
Dow et al.

(10) Patent No.: US 7,255,960 B1
(45) Date of Patent: Aug. 14, 2007

(54) BI-LIQUID PHASE REPLENISHMENT ELECTROLYTE MANAGEMENT SYSTEM

(75) Inventors: Eric G. Dow, Portsmouth, RI (US); Steven P. Tucker, Barrington, RI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/357,464

(22) Filed: Feb. 6, 2006

(51) Int. Cl.
*H01M 4/36* (2006.01)
*H01M 6/24* (2006.01)
*H01M 6/32* (2006.01)
*H01M 2/00* (2006.01)

(52) U.S. Cl. ............... 429/105; 429/101; 429/118; 429/63

(58) Field of Classification Search .......... 429/63, 429/101, 105, 118
See application file for complete search history.

(56) References Cited

U.S. PATENT DOCUMENTS

| | | |
|---|---|---|
| 4,942,100 A | 7/1990 | Hunter et al. |
| 5,162,168 A | 11/1992 | Downing et al. |
| 5,296,429 A | 3/1994 | Marsh et al. |
| 5,376,471 A | 12/1994 | Hunter et al. |
| 5,445,905 A | 8/1995 | Marsh et al. |
| 6,013,192 A | 1/2000 | Tucker et al. |

*Primary Examiner*—Gregg Cantelmo
*Assistant Examiner*—Eugenia Wang
(74) *Attorney, Agent, or Firm*—James M. Kasischke; Michael P. Stanley; Jean-Paul A. Nasser (57) ABSTRACT

An electrochemical cell system and methods for controlling the system are provided that are operated to produce an amount of current based upon power draw. The cell utilizes a solution phase catholyte introduced into a cell containing a metallic anode and a catalytic surface. A cathodic species is introduced into the space between the anode and the surface as a liquid along with electrolyte and liquid caustic. The mixture of caustic, electrolyte and liquid catholyte is continuously recirculated through the space, and a portion of the recirculation stream is exhausted in order to control the concentration of reaction products in each cell. Controllable injection mechanisms are used to inject the liquids from storage sources based upon the monitored power draw. The control mechanism independently controls each injection mechanism to inject appropriate amounts of caustic, electrolyte and atholyte to achieve the desired concentrations.

12 Claims, 5 Drawing Sheets

BI-LIQUID PHASE REPLENISHMENT ELECTROLYTE MANAGEMENT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of Invention

The present invention is directed to electrochemical systems and in particular to solution phase catholyte electrochemical systems.

2. Description of the Prior Art

In the present art, electrochemical systems produce useful electric currents as a result of chemical reactions conducted between an anode and a cathode. For example, these reactions are created by passing a liquid electrolyte, between the anode and the cathode. A typical electrolyte is an aqueous saltwater solution, such as seawater. Power sources or primary batteries based on electrochemical systems employing aqueous saltwater electrolytes have been developed. These power sources use aluminum and magnesium anodes, which are preferred for their high faradaic capacity, low atomic weight and high standard potentials.

Since seawater is a readily available source to be used as an aqueous electrolyte, electrochemical batteries are particularly useful for naval vessels. Other applications include providing power for sonobuoys.

In general, electrochemical energy sources have been developed to permit high voltages, to have large storage capacities, to operate safely and to deliver the stored energy reliably over extended discharge times. One type of electrochemical energy source is a high energy density aluminum-aqueous primary battery or semi-fuel cells (SFC) suitable for high current density (>500 mA/cm2) applications, that is current densities greater than 500 $mA/cm^2$.

Examples of these electrochemical batteries include the aluminum-silver oxide (Al—AgO) battery and the aluminum-hydrogen peroxide (Al—$H_2O_2$) SFC. These two couples have produced current at the high rates of 500-1600 $mA/cm^2$ with resultant specific energy densities of 190 Wh/kg for the Al—AgO battery and 210 Wh/kg for the Al—$H_2O_2$ SFC.

Other seawater batteries have been developed, all of which include solid cathodes, including silver chloride, cuprous chloride, lead chloride, cuprous iodide, cuprous thiocyanate and manganese dioxide.

In some applications, the seawater electrolyte is forced or drawn between an anode and a cathode that are electrically coupled through a load. Methods that have been used to force or draw the electrolyte through the electrochemical cell include using thermal and density differences or using active pumping. The voltage that is produced by these electrochemical batteries is controlled, for example, by using conventional voltage regulators. Voltage regulators are disadvantageous, however, in that they generally consume a relatively high level of power and are not highly reliable.

It is also known in the art that the output voltage of an electrochemical battery is proportional to the rate of flow of electrolyte through the cell containing the anode and cathode due to the change in operating temperature of the battery associated with variations in the flow rate of the electrolyte. Therefore, in other applications, control of the output voltage can be achieved by controlling the temperature of the electrochemical cell using the flow rate of the electrolyte. However, the control of the output voltage is not based on the current demands or power draw through the system. In addition, these systems require rather significant volumes of electrolyte to cause the desired cooling.

Therefore, the need exists for a system that controls the voltage output of an electrochemical cell based on the current power draw. In addition, the system should be able to use a relatively minimal volume of electrolytes, saving space and weight.

SUMMARY OF THE INVENTION

The present invention is directed to electrochemical cell systems and methods for controlling the electrochemical cell systems to provide the desired amount of current and voltage based upon power draw. Electrochemical cell systems in accordance with the present invention utilize a solution phase catholyte. The solution phase catholyte system is applicable to low current density, long endurance applications and is suitable for applications such as propulsion energy sources.

Each electrochemical cell contains a solid anode and a catalytic surface spaced from the anode. The cathodic species is introduced as a liquid into the space between the anode and the catalytic surface. In addition, the electrolyte and liquid caustic are also introduced into this space simultaneously with and independent of the liquid catholyte. The mixture of the liquid caustic, electrolyte and liquid catholyte is continuously recirculated through the space, and a portion of the recirculation stream is exhausted in order to control the concentration of reaction products in each cell.

The liquid caustic, the liquid electrolyte and the liquid catholyte are injected into the space between the anode and the catalytic surface from sources of liquid caustic, liquid electrolyte and liquid catholyte that are of an adequate concentration. Controllable injection mechanisms, such as solenoid valves, controllable orifices, or positive displacement pumps are used to inject the liquids from the storage sources. A control mechanism is provided for each injection mechanism.

The control mechanism monitors the power draw between the catalytic surface and the metallic anode, and based upon the monitored power draw, the control mechanism determines the desired concentrations of liquid caustic, electrolyte and catholyte in the space between the metallic anode and the catalytic surface. The desired concentrations are calculated to produce a sufficient amount of current to satisfy the power draw. The control mechanism independently controls each injection mechanism to inject appropriate amounts of liquid caustic, liquid electrolyte and liquid catholyte to achieve the desired concentrations. Each one of the liquid constituents is controlled and injected separately and independent of the other constituents.

By controlling the electrolyte product and reactant concentrations including the introduction of the cathode as a liquid in solution simultaneously with the injection of electrolyte and liquid caustic while exhausting overboard fractional cartridge outlet flow, electrochemical cell systems in accordance with exemplary embodiments of the present invention operate at specific energies that are significantly higher than the energies obtained from a closed system, i.e. systems that do not have continuous injection and exhaust of liquid constituents of electrolyte and solution phase catholyte during discharge of the electrochemical semi-fuel cell.

BRIEF DESCRIPTION OF THE DRAWINGS

Thus by the present invention its objects and advantages will become readily apparent upon reading the following detailed description is conjunction with the accompanying drawings, in which.

DETAILED DESCRIPTION OF THE PREFERRED EMBODIMENT(S)

Figure 1:
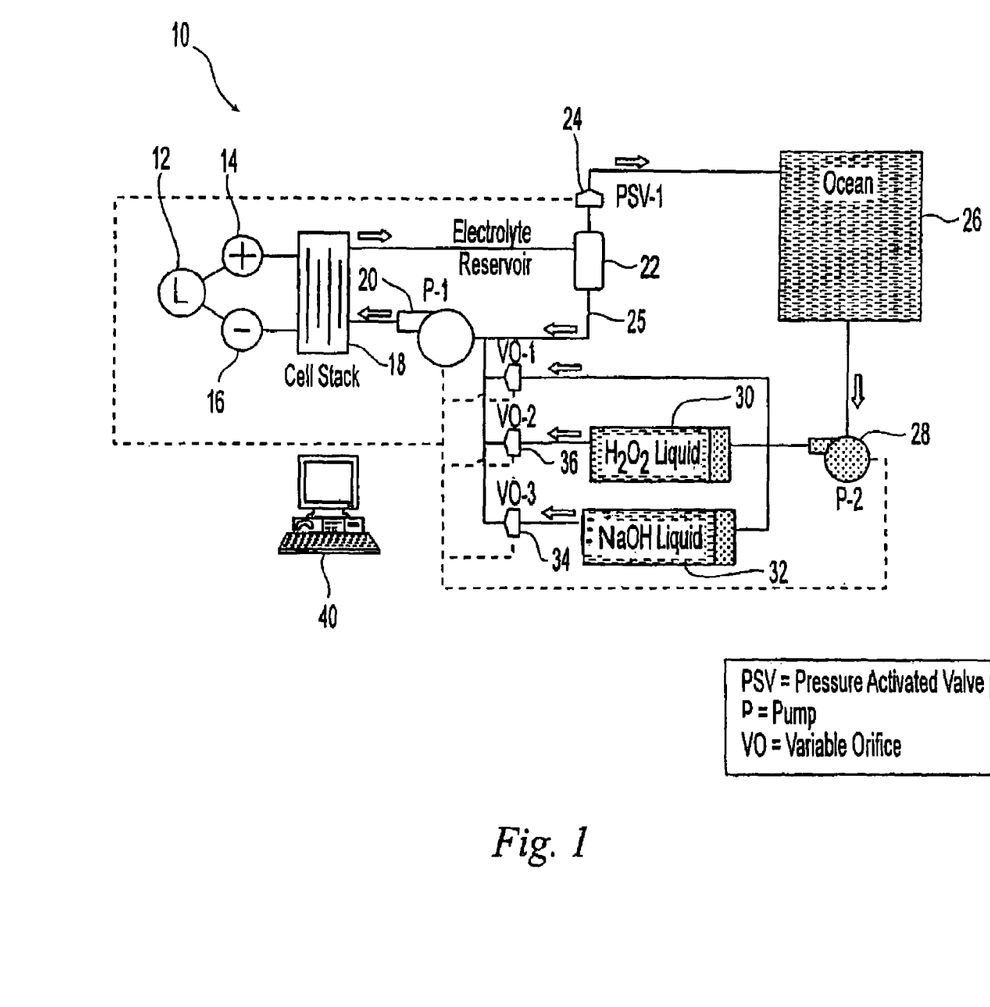
FIG. 1 is a schematic of an embodiment of an electrochemical cell system in accordance with the present invention.

Referring now to FIG. 1, an exemplary embodiment of an electrochemical system 10 in accordance with the present invention is illustrated. As illustrated, the system 10 includes an electrochemical cell stack 18 that includes at least one and preferably a plurality of electrochemical cells. The electrochemical cell stack includes a positive contact 14 and a negative contact 16. A load 12, such as an electrical or electronic device or an electric motor, is placed in contact between the positive contact 14 and the negative contact 16. Any suitable arrangement of the plurality of electrochemical cells can be used, including parallel and serial arrangements.

Figure 2:
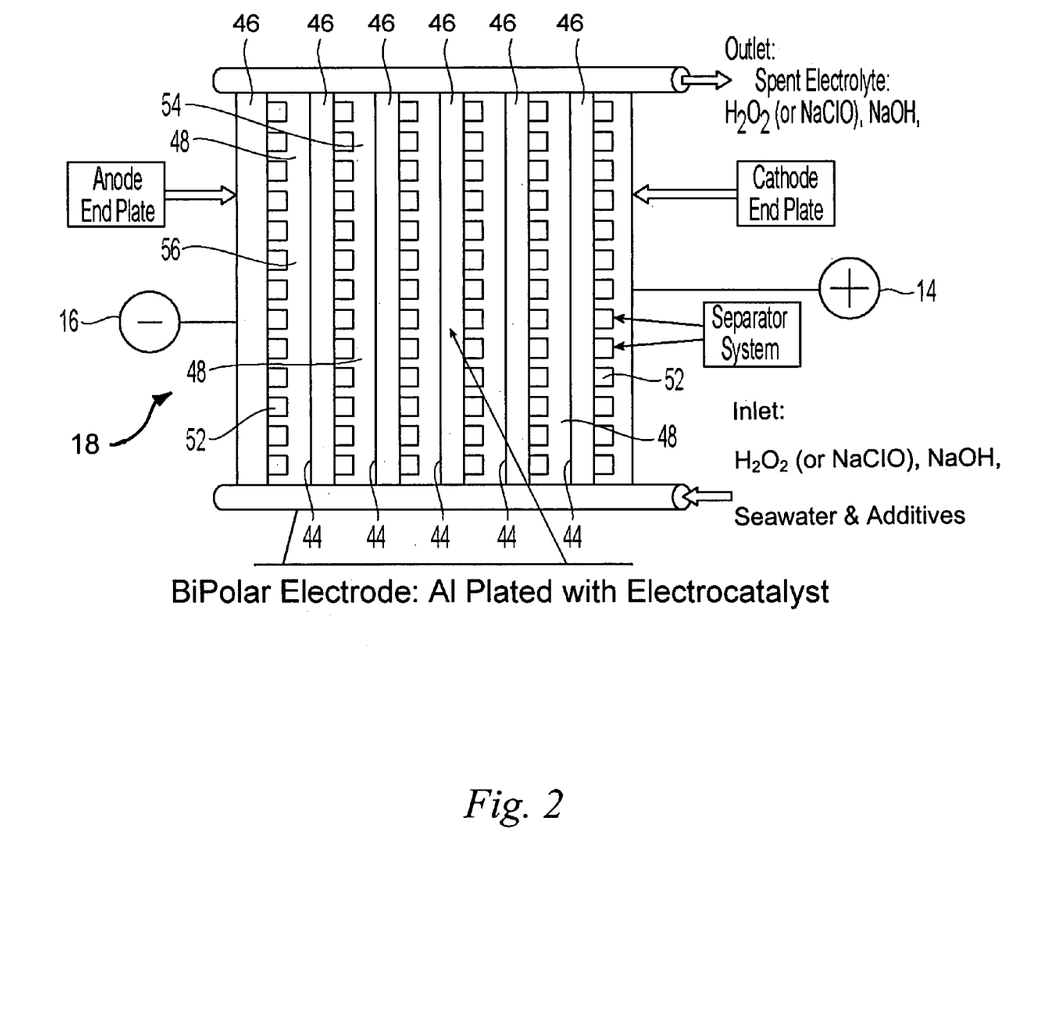
FIG. 2 is a schematic of a cell stack for use in the electrochemical cell system of FIG. 1.

As illustrated in FIG. 2, the electrochemical cell stack 18 preferably contains pile-configured electrodes that are arranged as a bi-polar stack of a plurality of individual electrochemical cells electrically coupled in series.

Figure 3:
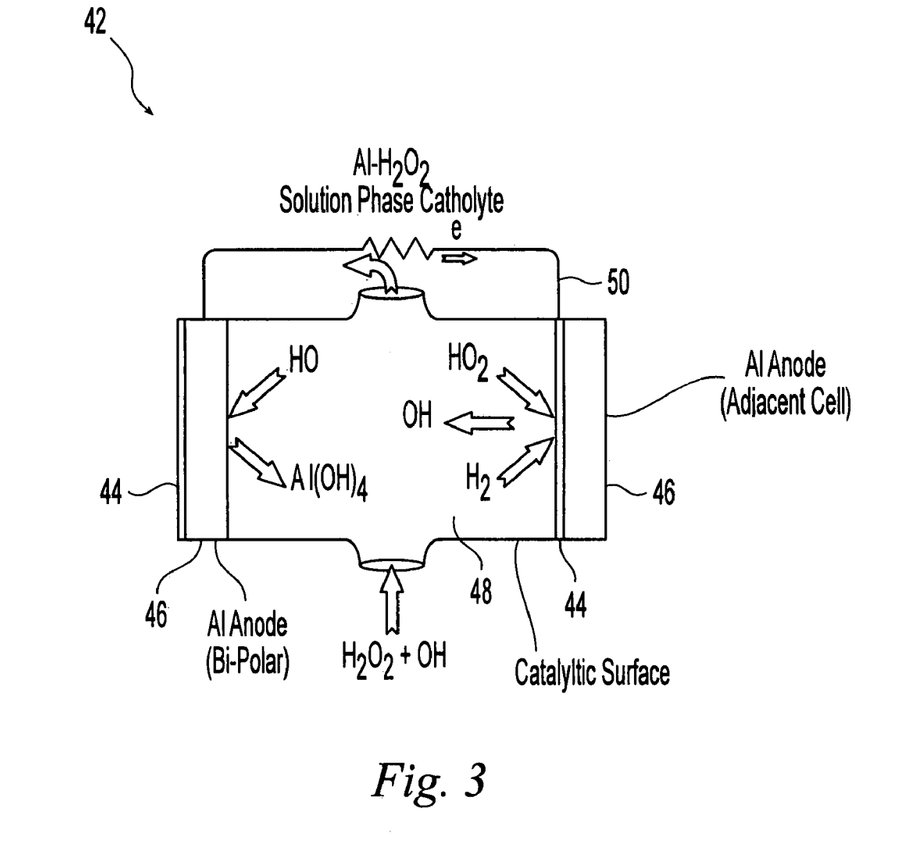
FIG. 3 is a schematic of a single cell for use in the cell stack of FIG. 2.

Referring now to FIG. 3, a single electrochemical cell 42 is illustrated that is contained in the electrochemical cell stack 18. The electrochemical cell 42 includes a metallic anode 46 and a catalytic surface 44 spaced from the metallic anode. Suitable materials for the metallic anode 46 include, but are not limited to, aluminum (such as 99.999% pure aluminum) magnesium, calcium, gallium, an aluminum alloy, (such as an alloy of aluminum and manganese) pot line aluminum and combinations thereof.

In one embodiment, the catalytic surface 44 is a catalyzed inert conductive substrate. Suitable catalyzed inert conductive substrates include, but are not limited to, nickel, copper and carbon catalyzed with palladium, iridium or silver. Since embodiments of electrochemical cells for use with systems in accordance with the present invention do not contain solid cathodes but instead use a liquid cathodic species, the catalytic surface is selected to be capable of reducing a liquid catholyte.

Upon reduction of the catholyte (such as a hydrogen peroxide catholyte) creating ions that migrate through a liquid filled space 48 between the anode and the catalytic surface 44. The ions oxidize the anode, causing the anode to loose electrons. This results in an electron flow 50 from the anode 46 to the catalytic surface 44, where the catalytic surface gains electrons to be used in reducing the cathodic species.

Referring again to FIG. 2, the cell stack 18 contains a plurality of the metallic anodes 46 and a plurality of the catalytic surfaces 44 arranged in parallel pairs to form a bi-polar stack. Adjacent pairs are electrically coupled in series.

In one embodiment, the catalytic surface 44 of a first parallel pair 54 is attached to the metallic anode 46 of a second parallel pair 56 that is disposed adjacent the first parallel pair 54. In order to maintain the space between the metallic anode 46 and the catalytic surface 44 while providing for the flow of liquid caustic, electrolyte and catholyte between the metallic anode and the catalytic surface through this space, a separator 52 is disposed between the metallic anode and the catalytic surface. Any separator 52 capable of providing the necessary structural support and fluid flow can be used, for example mesh and honeycomb materials as are known and available in the art.

Returning to FIG. 1, the system 10 also includes a source or reservoir of liquid caustic 32, a liquid electrolyte source 26 and a source or reservoir of liquid catholyte 30. Suitable liquid caustics include, but are not limited to, sodium hydroxide, potassium hydroxide, lithium hydroxide and combinations thereof.

In one embodiment, the source of liquid caustic 32 is a storage container constructed from a material that is compatible with the liquid caustic. The liquid caustic 32 is stored at a concentration greater than the desired concentration of caustic in the space between the metallic anode 46 and the catalytic surface 44. Therefore, only a fraction of the liquid caustic 32 is metered into the space between the metallic anode 46 and catalytic surface 44. Suitable catholytes include, but are not limited to, hydrogen peroxide, hypochlorite and combinations thereof.

In one embodiment, the source of liquid catholyte 30 is a storage container constructed from a material that is compatible with the liquid catholyte. The liquid catholyte 30 is stored at a concentration greater than the desired concentration of catholyte in the space between the metallic anode 46 and the catalytic surface 44. Therefore, only a fraction of the liquid catholyte 30 is metered into the space between the metallic anode 46 and catalytic surface 44.

Suitable electrolytes include, but are not limited to, saltwater, seawater, liquid brine and combinations thereof. In one embodiment, the liquid electrolyte source 26 is seawater from the ocean. The concentration of liquid electrolyte is determined by the ambient conditions of the ocean with which the system is in contact. The liquid electrolyte can be delivered to the system from the liquid electrolyte source 26 (such as the ocean) using gravity or thermal gradients.

In one embodiment, the system 10 includes a supply pump 28 in fluid contact with the electrolyte source 26. Any supply pump that is compatible with the liquid electrolyte and capable of delivery the liquid electrolyte to the cell stack 18 at the appropriate flow and pressure can be used. Suitable pumps are known and available in the art. The supply pump 28 can also be used to deliver the liquid caustic 32 and the liquid catholyte 30. Alternatively, separate supply pumps (not shown) can be provided for the source of the liquid caustic 32 and the source of the liquid catholyte 30.

In one embodiment, the supply pump 28 is in communication with the source of the liquid caustic 32 and the source of the liquid catholyte 30. The supply pump 28 delivers the liquid electrolyte to each source to pressurize the sources. This pressure is used to deliver the liquid caustic 32 and the liquid catholyte 30 to the cell stack 18.

In one embodiment, the system 10 includes an injection mechanism capable of injecting the liquid caustic 32, the liquid electrolyte and the liquid catholyte 30 between the metallic anode 46 and the catalytic surface 44. The injection mechanism (not shown) can include pumps, valves (such as pressure-activated valves) variable orifices and injectors (such as venture injectors) and combinations thereof. In one embodiment, the injection mechanism includes a plurality of controllable, variable orifices capable of independently controlling flow from the source of the liquid caustic 32, the liquid electrolyte source 26 and the source of the liquid catholyte 30. These variable orifices include an liquid of electrolyte source 26, a liquid caustic source variable orifice 34 in communication with the source of the liquid caustic 32 and a liquid catholyte variable orifice 36 in communication with the source of the liquid catholyte 30. Suitable variable orifices are known and are available in the art.

In one embodiment, the system 10 includes a recirculation loop 25 in fluid communication with the cell stack 18 to recirculate the mixture of the liquid caustic 32, the liquid electrolyte and the liquid catholyte 30 through each electrochemical cell in the cell stack. The recirculation loop 25 includes a recirculation pump 20 and a liquid electrolyte reservoir 22 to provide for the desired volume of recirculated liquid. In one embodiment, the volume of recirculated liquid is minimized, for example less than 4 liters.

In communication with the recirculation loop 25 is an exhaust system to exhaust undesirable reaction products (such as sodium aluminate) from the system 10. In one embodiment, the exhaust system is in communication with the liquid electrolyte reservoir 22. The exhaust system can be a passive exhaust or an active, controlled exhaust system. The exhaust system includes a pressure-activated valve 24. The exhaust system exhausts to the ambient environment (such as the ocean).

In one embodiment, the system 10 includes a control mechanism 40 in communication various parts of the system including pumps, valves, orifices, the injection mechanisms, the exhaust system, and any sensors within the system. The control mechanism 40 can also monitor any load that is connected to the cell stack 18. The control mechanism 40 is capable of monitoring the power draw between the catalytic surface 44 and the metallic anode 46. Based upon the power draw, the control mechanism 40 can determine the desired concentrations of the liquid caustic 32, the liquid electrolyte and the liquid catholyte 30 that are needed in the space between the metallic anode 46 and the catalytic surface 44 to produce the necessary voltage. The control mechanism 40 can then control the injection mechanism and any other part of the system including pumps and valves, to inject appropriate amounts of the liquid caustic 32, the liquid electrolyte and thee liquid catholyte 30 to achieve the desired concentrations.

The injection of the liquid electrolyte, the liquid caustic 32 and the liquid catholyte 30 are handled separately and independent of each other. In one embodiment, the liquid catholyte 30 is injected into the recirculation loop 25 separate from the injection of either the liquid caustic 32 or the liquid electrolyte. Suitable control mechanisms 40 include personal computers and programmable logic controllers.

In one embodiment, where the cell stack 18 contains a plurality of the electrochemical cells 42, the liquid caustic 32, the liquid electrolyte and the liquid catholyte 30 are introduced simultaneously into the plurality of electrochemical cells. The introduction of the liquid caustic electrolyte includes introducing sodium hydroxide, potassium hydroxide, lithium hydroxide and combinations thereof, and the introduction of the electrolyte includes introducing saltwater, seawater, liquid brine and combinations thereof. The introduction of the liquid catholyte 30 includes introducing a hydrogen peroxide catholyte, although other types of catholytes can be used including hypochlorite catholytes. In one embodiment, the catholyte is aluminum-hypochlorite (Al—ClO$^-$). In another embodiment, the catholyte is aluminum-hydrogen peroxide (Al—H$_2$O$_2$)

In one exemplary method for controlling the electrochemical cell 42 in accordance with the present invention, the liquid caustic 32, the liquid electrolyte and the liquid catholyte 30 are introduced into an electrochemical cell in the cell stack 18. Preferably, the liquid catholyte 30 is introduced into the electrochemical cell 42 simultaneously with and independently of the introduction of the liquid caustic 32 and the liquid electrolyte. In one embodiment, each electrochemical cell is hydraulically fed in parallel with seawater and a 4% w/w concentration of sodium hydroxide (NaOH). The liquid catholyte 30 is carried and injected separately and directly upstream of the space or gap in the electrochemical cell 42 between the metallic anode 46 and the catalytic surface 44. The rate of injection is determined based upon the concentration of the source of the liquid electrolyte, the liquid caustic 32 and the liquid catholyte 30 and the desired concentration based on power draw.

The power draw from the electrochemical cell 42 or all of the electrochemical cells in the cell stack 18 are monitored and used to determine the desired concentrations of the liquid caustic 32, the liquid electrolyte and the liquid catholyte 30 in the electrochemical cell 42. The introduction of the liquid caustic 32, the liquid electrolyte and the liquid catholyte 30 is controlled to establish the desired concentrations of the liquid caustic 32, the liquid electrolyte and the liquid catholyte 30 in the electrochemical cell. Because a separate injection mechanism is provided for each one of the liquid caustic 32, the liquid electrolyte and the liquid catholyte 30, the introduction of the liquid catholyte is controlled independently of the introduction of at least one of the liquid caustic and the liquid electrolyte and preferably independently of both the introduction of the liquid caustic and the introduction of the electrolyte.

In one embodiment, the liquid caustic 32, the liquid electrolyte and the liquid catholyte 30 through each one of the electrochemical cells 42 in the cell stack 18, and a fraction of the recirculated liquid caustic, the liquid electrolyte and the liquid catholyte 30 are exhausted from the recirculation loop 25 to limit concentrations of undesirable reaction products in the electrochemical cell 42. The volume of recirculated liquid is minimized to limit the size and weight of the recirculation loop 25 and the amount of liquid required. In one embodiment, the volume of recirculated liquid caustic 32, the liquid electrolyte and catholyte 30 is maintained at a level of less than about 4 liters.

Exemplary systems and methods in accordance with the present invention, provide the highest possible specific energy on an electrochemical cell systems basis. This high specific energy is created by recirculating the electrolyte through each electrochemical cell and keeping the recirculated volume to a minimum volume of less than about 4 liters, thus occupying little space and minimizing weight within the vehicle.

In addition, as the reaction of the electrochemical cell stack 18 drives the concentration of undesirable reaction products such as sodium aluminate (NaAlO2) to high levels, controlled ejection of the electrolyte overboard via an exhaust mechanism limits this buildup to predetermined levels. The liquid catholyte and liquid caustic 32 are stored at concentrations significantly greater than those used in the cell stack 18, and controlled metering establishes the required concentrations within the cell stack.

The electrochemical reactions for the solution phase catholyte electrochemical or semi-fuel cells in accordance with the present invention are as follows:

Aluminum-Hydrogen Peroxide (Al—H$_2$O$_2$):
Anode: $2Al+8OH^- 2Al(OH)_4^- +6e^-$
Cathode: $3H_2O_2+6e^- \rightarrow 6OH^-$ Overall Rxn: $2Al+3H_2O_2+2OH^- \rightarrow 2Al(OH)_4^-$, $E_{celltheor}^\circ = 3.23V$ The bi-liquid phase replenishment electrolyte management system in accordance with exemplary embodiments of the present invention, allows for the steady state operation of the Al-SFC at any ratio of $[OH^-]$: $[AlO_2^-]$ electrolyte concentration. From a systems standpoint, the sensitivity of specific energy to electrolyte species concentration is shown in Table 1.

TABLE 1

| | [OH⁻] | | | | |
|---|---|---|---|---|---|
| $[AlO^-]_2$ | 0.5 | 1.0 | 1.2 | 1.5 | 2.0 |
| 0.5 | 345 | 295 | 271 | 248 | 218 |
| 1.0 | 400 | 359 | 344 | 326 | TBD |
| 1.2 | 412 | 375 | 360 | 343 | TBD |
| 1.5 | 420 | 390 | 380 | 363 | 340 |

Table 1 illustrates the specific energy [Wh/kg] for a given set point of $[OH^-]$: $[AlO_2^-]$ for 10%, 10% and 5% corrosion, direct and decomposition efficiencies, respectively. Tolerating higher aluminate levels allows a reduction in the rates of exhausting electrolyte from the recirculation loop. Reducing the rates of exhausting, facilitates a reduction in the mass of stored NaOH and $H_2O_2$, assuming a constant cell potential of 1.6 volts/cell.

As the ratio of $[OH^-]$: $[AlO_2^-]$ approaches 1:1, a goal is to minimize cell polarization. Using the metrics in Table 1 as a baseline, the sensitivity of the specific energy of the electrochemical cells 42 in accordance with the present invention are shown in Table 2, which illustrates the specific energy [Wh/kg] of an Al-SFC base on voltage variations for 10%, 10% and 5% corrosion, direct and decomposition efficiencies, respectively.

TABLE 2

| | Cell Voltage [Volts] | | |
|---|---|---|---|
| | 1.65 | 1.50 | 1.35 |
| S.E. [Wh/kg] | 375 | 340 | 300 |

Systems and methods in accordance with the present invention utilize a simple bipolar electrochemical cell stack 18. This cell stack does not require an ion diffusion membrane, reducing complexity, weight (i.e. non-energy-producing weight) and cost and increasing reliability and cell potential. In addition, other cathodic species, for example $Ca(ClO)_2$, can replace the $H_2O_2$ catholyte species because the mechanics of catholyte injection for the solution-phase operation is identical among the various catholyte species. Only the method of storage and availability for injection are different. Gas generation resulting from the parasitic chemical reactions is handled using an exhaust mechanism such as passive exhaust overboard. Gas generation rates are typically less than about 0.05 standard cubic feet per minute while operating at maximum power levels.

Figure 4:
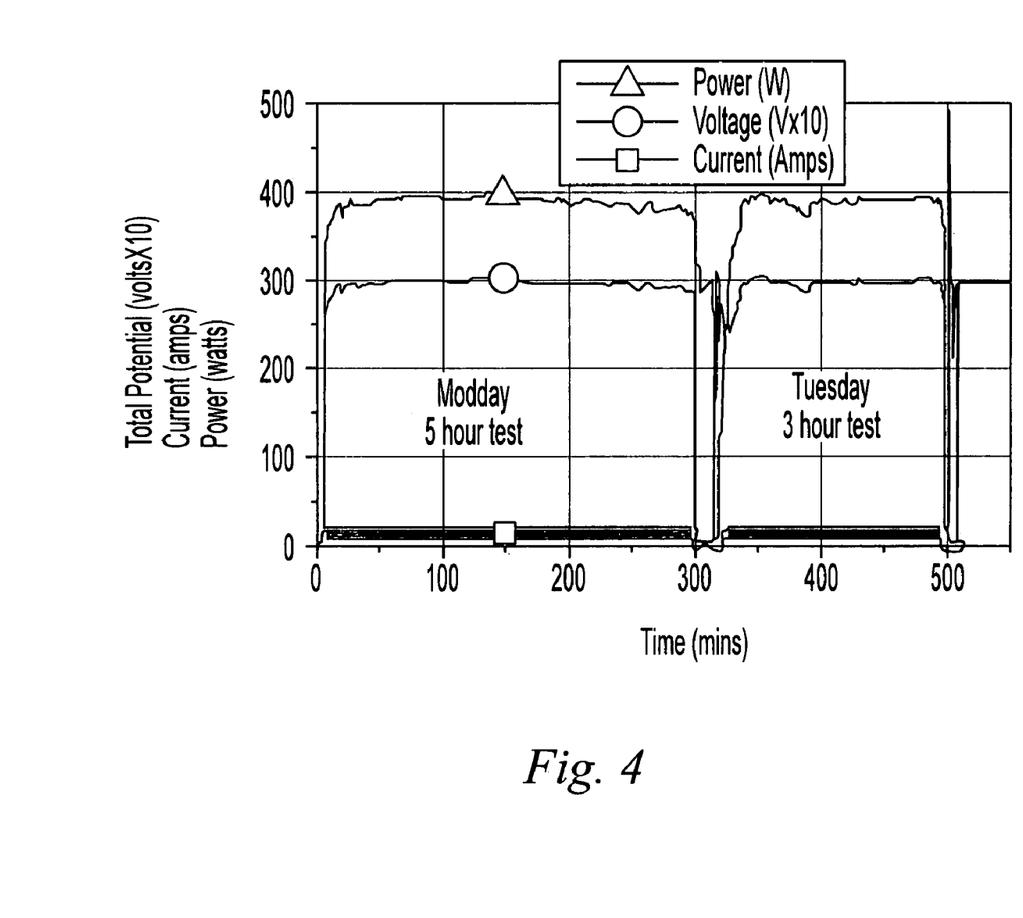
FIG. 4 is a graph depicting power, voltage and current versus time for an electrochemical cell of the present invention.
Figure 5:
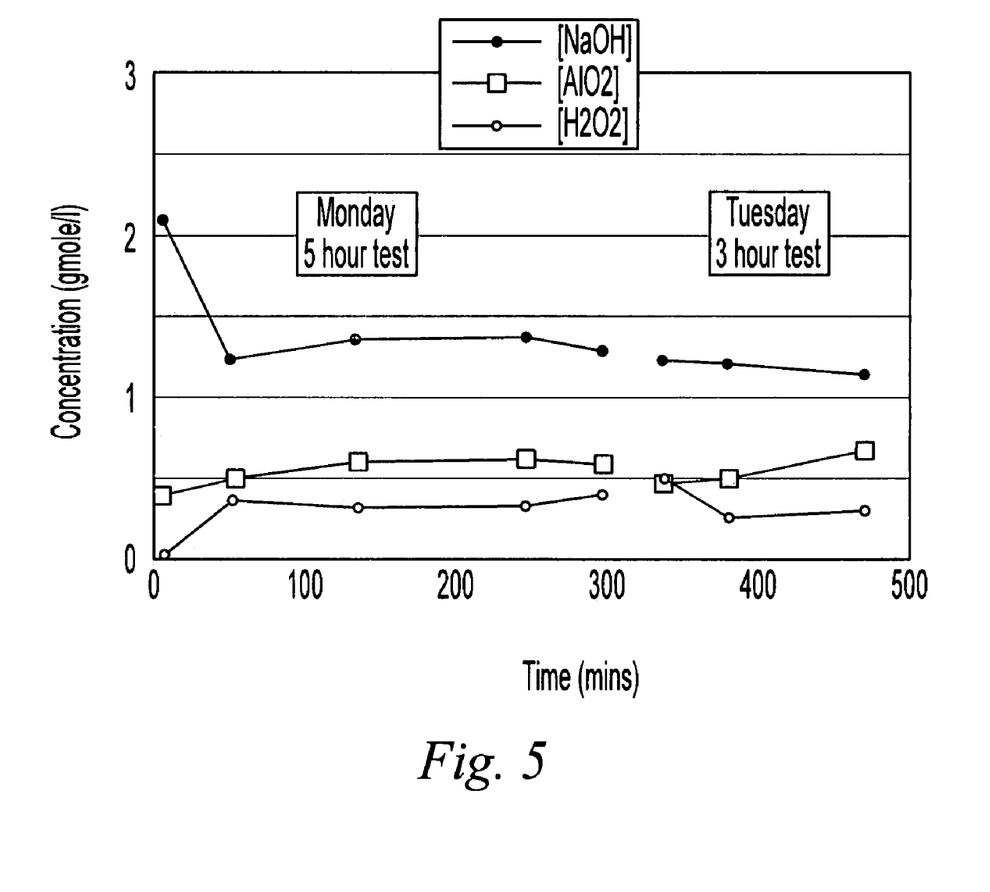
FIG. 5 is a graph depicting concentration of caustic, electrolyte and cathodic species versus time for the electrochemical cell of the present invention.

Referring to FIGS. 3 and 4, the voltage and concentration profiles, respectively, for a twenty cell cartridge system operated in accordance with the present invention are illustrated. The operation of the system 10 included the successful shutdown of the discharge at the five-hour mark and the successful restart the following day, demonstrating excellent continuity in cell performance. The system utilizes a electrolyte reservoir of 1000 cc volume.

Advantages of exemplary embodiments of the electrochemical cell system 10 and methods of using the system of the present invention include controlling the electrolyte concentrations at constant optimum levels for the operation of flowing aqueous electrolyte batteries. In addition, the system 10 continuously injects the liquid catholyte 30 into the cell stack 18 at a controlled rate dependent on power draw. The liquid catholyte 30 is stored at relatively high concentrations of greater than about 50 wt. % and injected into the electrochemical cell 42 at a resulting solution concentration in the electrolyte of less than about 0.5 wt. %.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An electrochemical system comprising:
   a metallic anode;
   a catalytic surface spaced from said metallic anode, with said catalytic surface capable of reducing a liquid catholyte;
   a source of liquid caustic;
   a source of liquid electrolyte;
   a source of liquid catholyte;
   an injection mechanism capable of injecting the liquid caustic, the liquid electrolyte and the liquid catholyte between said metallic anode and said catalytic surface; and
   a control mechanism in communication with said injection mechanism, said control mechanism capable of monitoring a power draw between said catalytic surface and said metallic anode, determining desired concentrations of the liquid caustic, the liquid electrolyte and the liquid catholyte between said metallic anode and said catalytic surface based upon the monitored power draw and controlling said injection mechanism to inject appropriate amounts of the liquid caustic, the liquid electrolyte and the liquid catholyte to achieve desired concentrations.

2. The system of claim 1, wherein said metallic anode consists of a selection from aluminum, magnesium, calcium, gallium, an aluminum alloy and pot line aluminum.

3. The system of claim 2, wherein said catalytic surface comprises a catalyzed inert conductive substrate.

4. The system of claim 3, wherein said catalytic surface is selected from the group consisting of nickel, copper catalysed with palladium, iridium and silver carbon catalyzed with palladium, iridium and silver.

5. The system of claim 1, further comprising a plurality of metallic anodes and a plurality of catalytic surfaces arranged in parallel pairs to form a bi-polar stack, wherein said pairs of metallic anodes and said pairs of catalytic surfaces are electrically coupled in series.

6. The system of claim 5, wherein said catalytic surfaces of a first parallel pair is attached to said metallic anode of a second parallel pair that is disposed adjacent said first parallel pair.

7. The system of claim 1, further comprising a separator disposed between said metallic anode and said catalytic surface, said separator arranged to maintain a space between said metallic anode and said catalytic surface while providing for flow of the liquid caustic, the liquid electrolyte and the liquid catholyte between said metallic anode and said catalytic surface.

8. The system of claim 1, wherein said source of liquid caustic is selected from a group consisting of sodium hydroxide, potassium hydroxide and lithium hydroxide.

9. The system of claim 1, wherein said source of liquid electrolyte is selected from a group consisting of saltwater, seawater and liquid brine.

10. The system of claim 1, wherein said source of liquid catholyte is selected from a group consisting of hydrogen peroxide and hypochlorite.

11. The system of claim 1, wherein said injection mechanism comprises a plurality of controllable, variable orifices in communication with said control mechanism, said orifices capable of independently controlling flow from said source of liquid caustic and said source of liquid catholyte.

12. The system of claim 1, said system further comprising an exhaust system in communication with said control mechanism to exhaust undesirable reaction products from said system.

* * * * *